United States Patent [19]
Leung

[11] Patent Number: 6,064,636
[45] Date of Patent: May 16, 2000

[54] MULTIPLE MEDIUM-STORAGE DISC CHANGER

[75] Inventor: Wilson Wai Sing Leung, Hong Kong, The Hong Kong Special Administrative Region of the People's Republic of China

[73] Assignee: Alco Electronics Ltd., The Hong Kong Special Administrative Region of the People's Republic of China

[21] Appl. No.: 09/072,385

[22] Filed: May 4, 1998

[51] Int. Cl.[7] .................................................. G11B 17/22
[52] U.S. Cl. ............................................................ 369/37
[58] Field of Search .................................. 369/37, 36, 38, 369/191–192, 178

[56] References Cited

U.S. PATENT DOCUMENTS 4,996,680   2/1991   Staar .......................................... 369/37
5,146,451   9/1992   Kang ........................................ 369/270

FOREIGN PATENT DOCUMENTS 9120616   5/1997   Japan .

Primary Examiner—Allen T. Cao
Attorney, Agent, or Firm—Browning Bushman

[57] ABSTRACT

A multiple medium-storage disc changer (100) comprising a housing (110), a turntable (400) slidable out of and into the housing (110) and providing a circular series of inclined seats (401) for holding respective discs (501) in a tilted and overlapping arrangement. The disc changer (100) includes a movable playing mechanism (600) provided under the turntable (400) and comprising a spinning support (620) for lifting and supporting a disc (501) off the respective seat (401) and a laser head (622) for playing the supported disc (501). A separate holder (270) is provided which is movable to hold, from above, the disc (501) against the spinning support (620) for playing by the laser head (622).

18 Claims, 11 Drawing Sheets

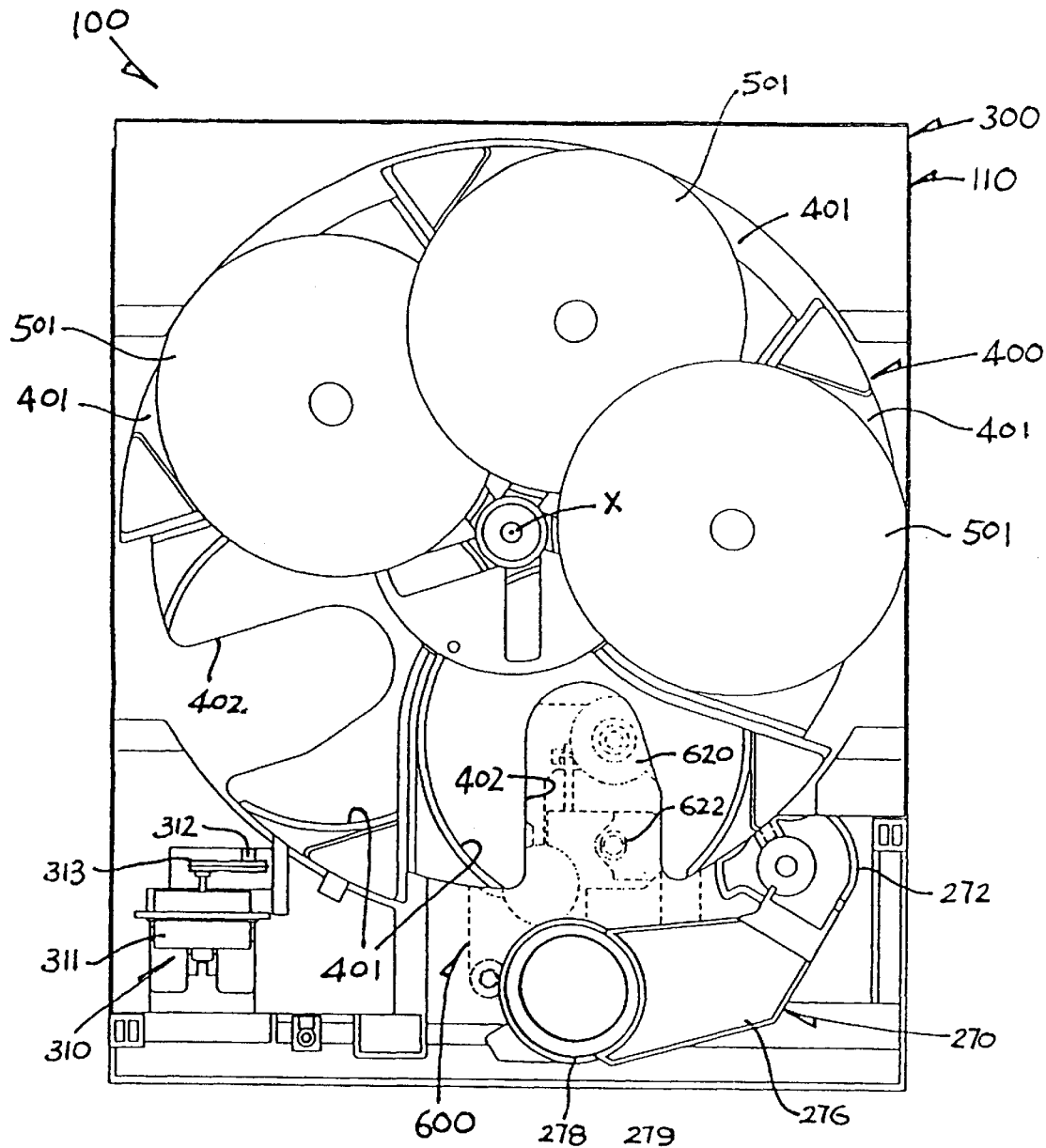
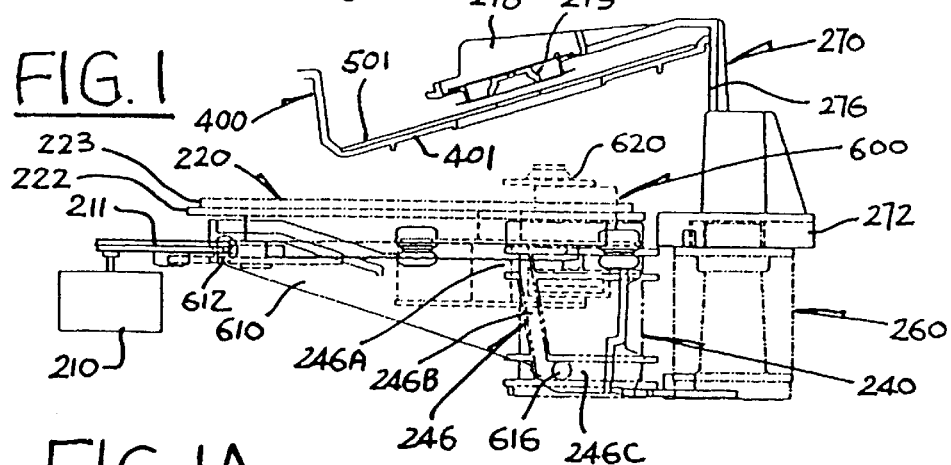

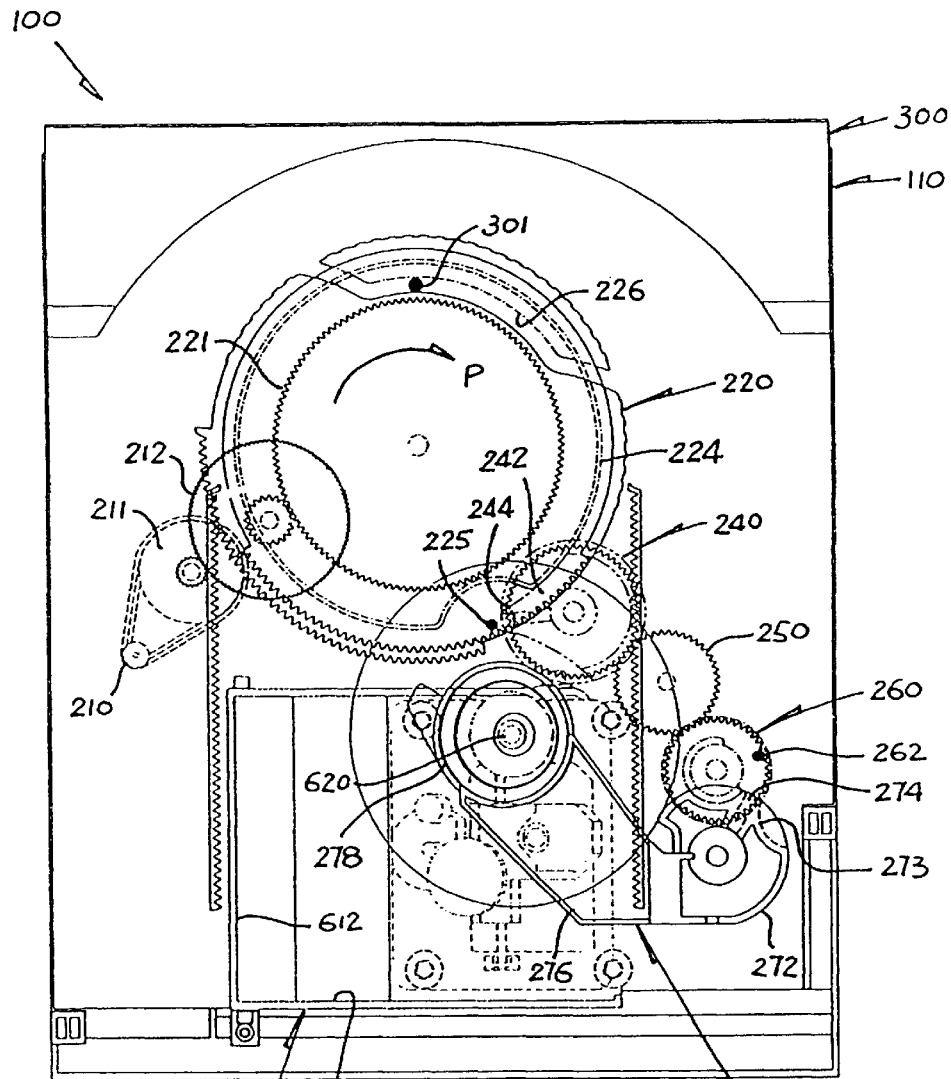
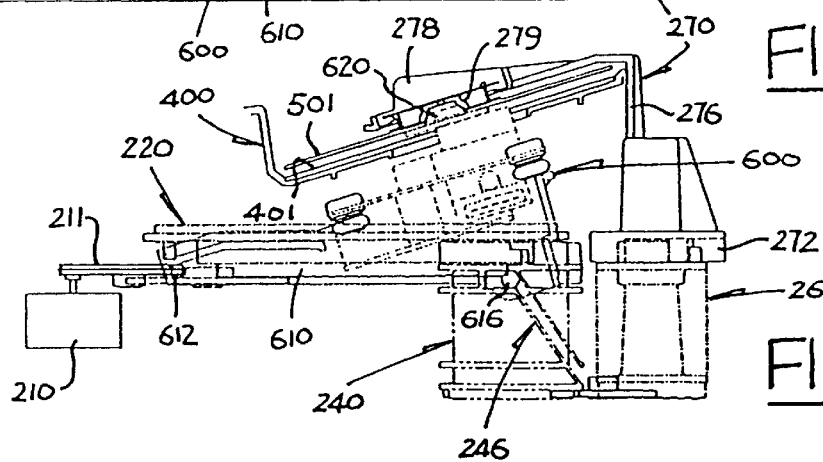
FIG. 7
FIG. 7A

MULTIPLE MEDIUM-STORAGE DISC CHANGER

BACKGROUND OF THE INVENTION

Field of the Invention

The present invention relates to a changer for a plurality of medium-storage discs such as compact discs or the like.

SUMMARY OF THE INVENTION

According to the invention, there is provided a multiple medium-storage disc changer comprising a housing, a turntable slidable out of and into the housing and providing a circular series of inclined seats for holding respective discs in a tilted and overlapping arrangement, a movable playing mechanism provided under the turntable and comprising a spinning support for lifting and supporting a disc off the respective seat of the turntable and a laser head for playing the supported disc, and a separate holder movable to hold, from above, the disc against the spinning support for playing by the laser head.

Preferably, each seat of the turntable is arranged to hold a respective disc at an angle substantially in the range of 15° to 20° to horizontal.

More preferably, each seat of the turntable is arranged to hold a respective disc at an angle substantially of 17° to horizontal.

It is preferred that the spinning support is arranged to lift said disc from the respective seat in a manner substantially parallel to and for a distance substantially in the range of 2 mm to 6 mm off the seat.

It is further preferred that the spinning support is arranged to lift said disc from the respective seat in a manner substantially parallel to and for a distance substantially of 4.3 mm off the seat.

In a preferred arrangement, the holder is pivotable about a substantially vertical axis between an operative position and an inoperative position.

In a preferred arrangement, the spinning support and laser head of the playing mechanism are pivotable about a substantially horizontal axis between an upper operative position and a lower inoperative position.

Preferably, the movements of the holder and the playing mechanism are synchronized.

More preferably, the movements of the holder and the playing mechanism are effected by means of a drive mechanism incorporating a common cam member.

It is preferred that the drive mechanism includes a motor-driven drive member for driving the cam member.

More preferably, the drive member is arranged to also slide the turntable out of and into the housing.

In a preferred embodiment, the turntable is rotatably supported on a tray for being slid out of and into the housing, said tray comprising a gear rack for driving engagement with the drive member to cause the sliding of the tray.

More preferably, the tray is provided with two opposed said gear racks for driving engagement, at different times, with the drive member to cause the sliding of the tray while the playing mechanism and holder are in operative and inoperative positions, respectively.

In a specific construction, the holder has a pivoted lower end, a free upper end for holding said disc against the spinning support, and a crooked arm connecting the upper end to the lower end.

In a preferred embodiment, the turntable is provided with parts which form gaps with the respective seats for restricting the movement of said discs upon removal.

Preferably, the turntable is rotatably supported on a tray for being slid out and in through an opening of the housing, and the tray supports at its front end a door for closing the opening, which door is movable downwards to reveal the opening when the tray slides initially out and subsequently upwards to close the opening when the tray slides almost completely in.

More preferably, the door is hinged to opposite sides of the front end of the tray by means of two links.

The invention also provides a compact disc player which incorporates the aforesaid disc changer.

BRIEF DESCRIPTION OF THE DRAWINGS

The invention will now be more particularly described, by way of example only, with reference to the accompanying drawings, in which:

FIG. 1 is a top plan view of an embodiment of a multiple medium-storage disc changer in accordance with the invention, showing a turntable supported on a tray in an innermost position and a playing mechanism and a holder arm in respective inoperative positions;

FIG. 1A is an end view of the disc changer of FIG. 1 in the same condition;

FIG. 6A is an end view of the disc changer of FIG. 6 in the same condition;

FIG. 7 is a top plan view corresponding to FIG. 6, showing the playing mechanism and holder arm being moved by the drive mechanism to respective operative positions;

FIG. 7A is an end view of the disc changer of FIG. 7 in the same condition;

DETAILED DESCRIPTION OF PREFERRED EMBODIMENTS

Figure 5:
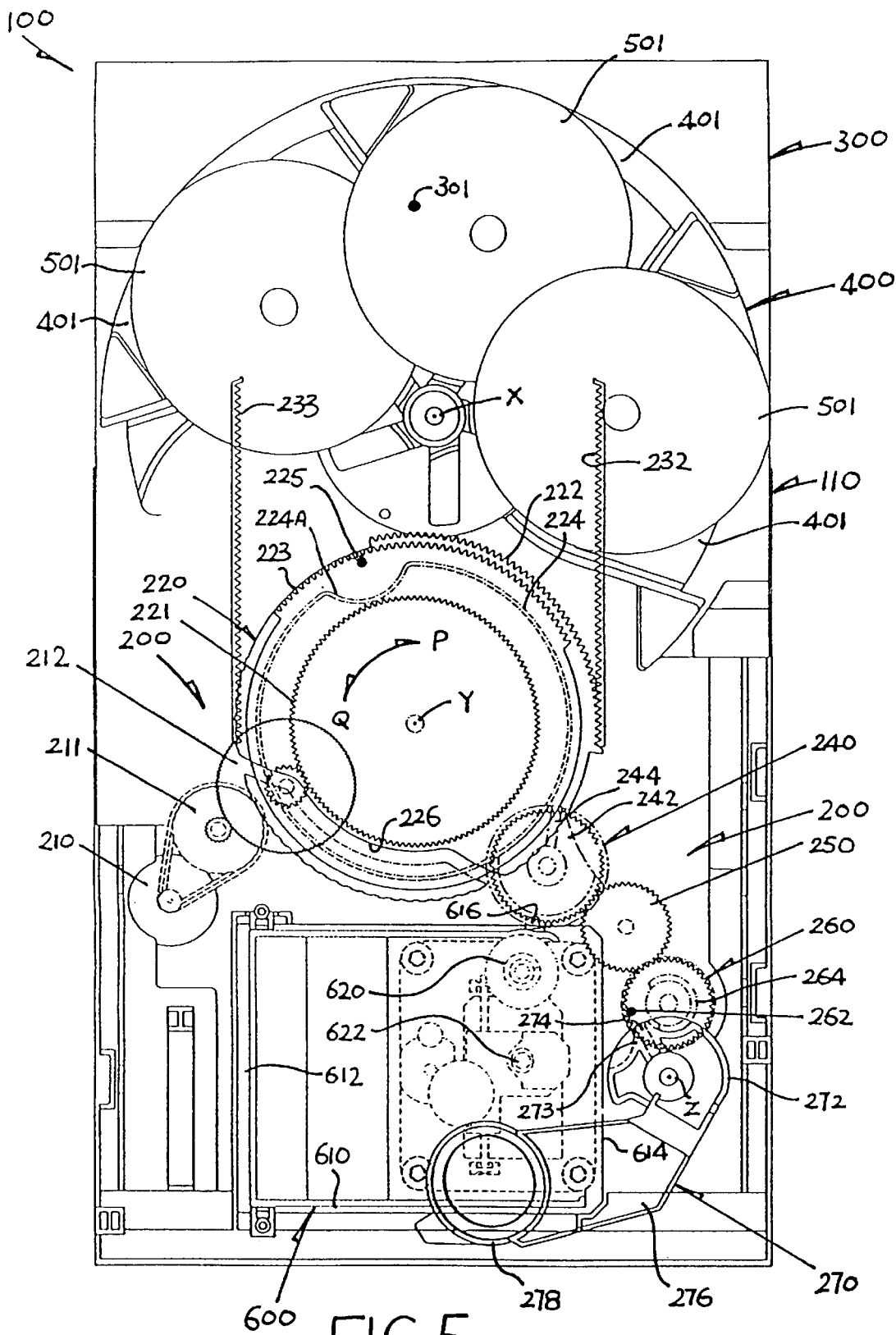
FIG. 5 is a top plan view corresponding to FIG. 4, showing the tray being slid fully out by the drive mechanism.

Referring firstly to FIGS. 1 to 9, particularly FIG. 5, of the drawings, there is shown a multiple medium-storage disc changer 100 embodying the invention, for a compact disc or CD player, which disc changer 100 has a housing 110, a generally rectangular tray 300 slidable into and out of the housing 110, a generally circular turntable 400 rotatable about a vertical axis X on the tray 300 for holding five CDs 501, and a playing mechanism 600 provided underneath the turntable 400 for playing the CDs 501. At equi-angular positions around the axis X, the turntable 400 is formed with a circular series of five identical seats 401 which are inclined individually at an angle preferably of 17° (in the range of 15° to 20°) to horizontal for holding respective CDs 501 in a tilted and overlapping arrangement such that each CD overlaps with the two adjacent CDs on opposite sides. This arrangement enables the five CDs 501 to occupy a horizontal space which is as small as that would be occupied by only three of them laid flat equi-angularly on a plane without any such tilting and overlapping.

Figure 2:
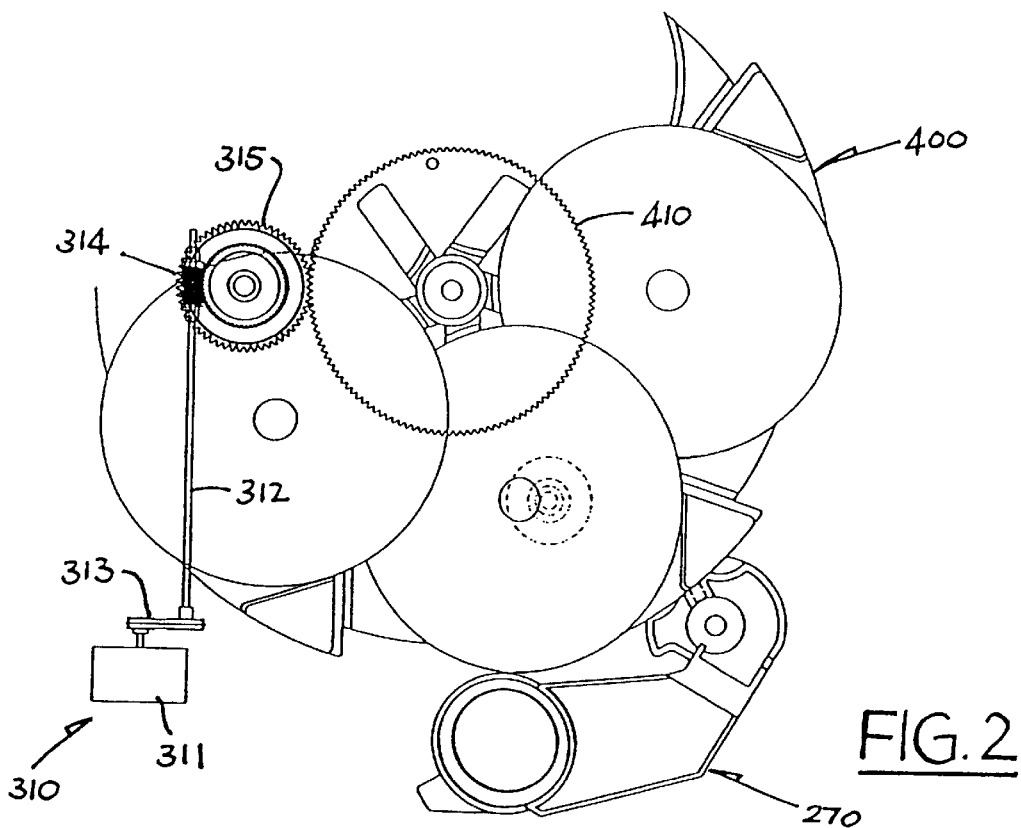
FIG. 2 is a top plan view of the turntable of FIG. 1, showing a drive mechanism therefor.
Figure 3:
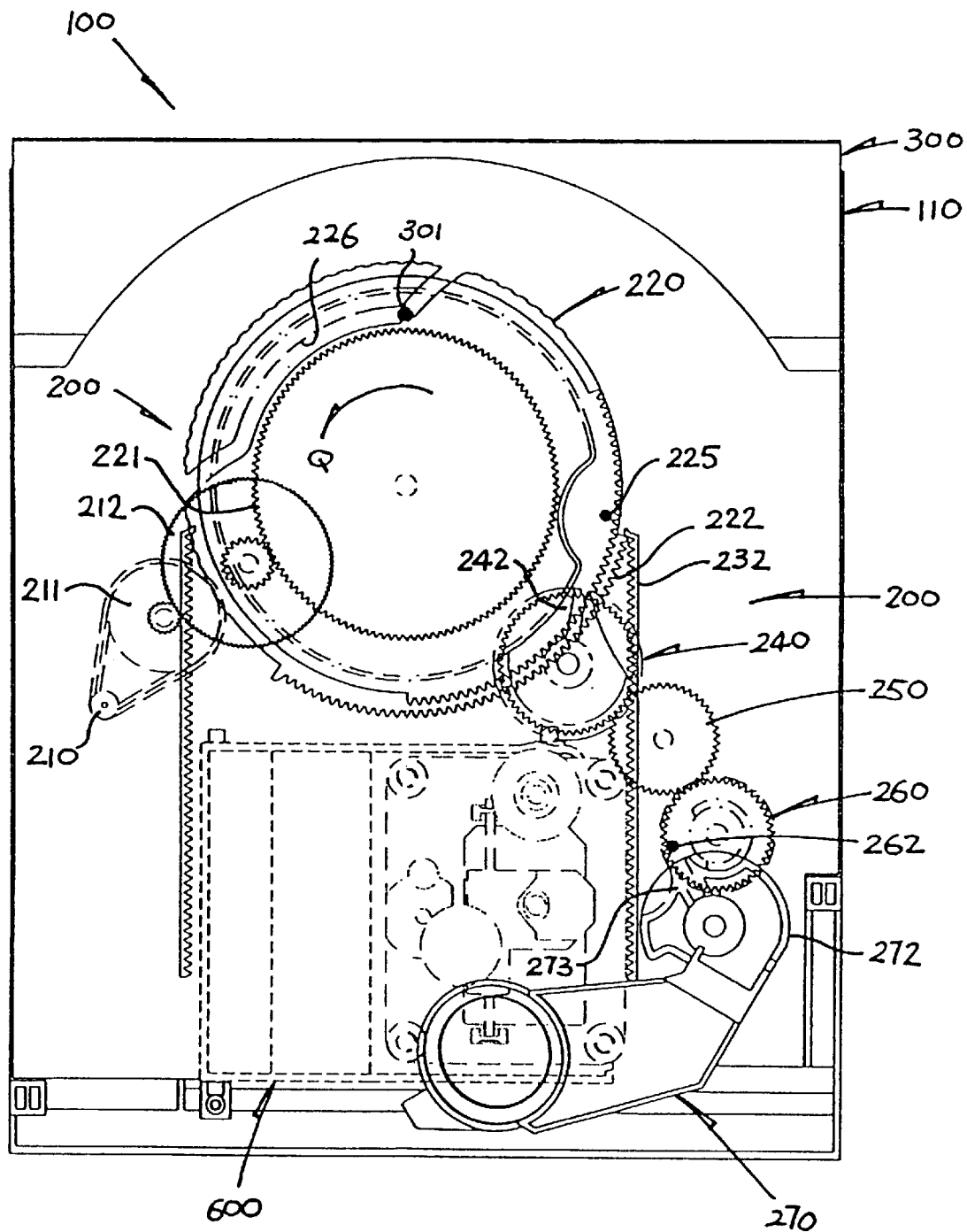
FIG. 3 is a top plan view of the disc changer of FIG. 1, showing a drive mechanism for sliding the tray in and out and for moving the playing mechanism and holder arm.
Figure 4:
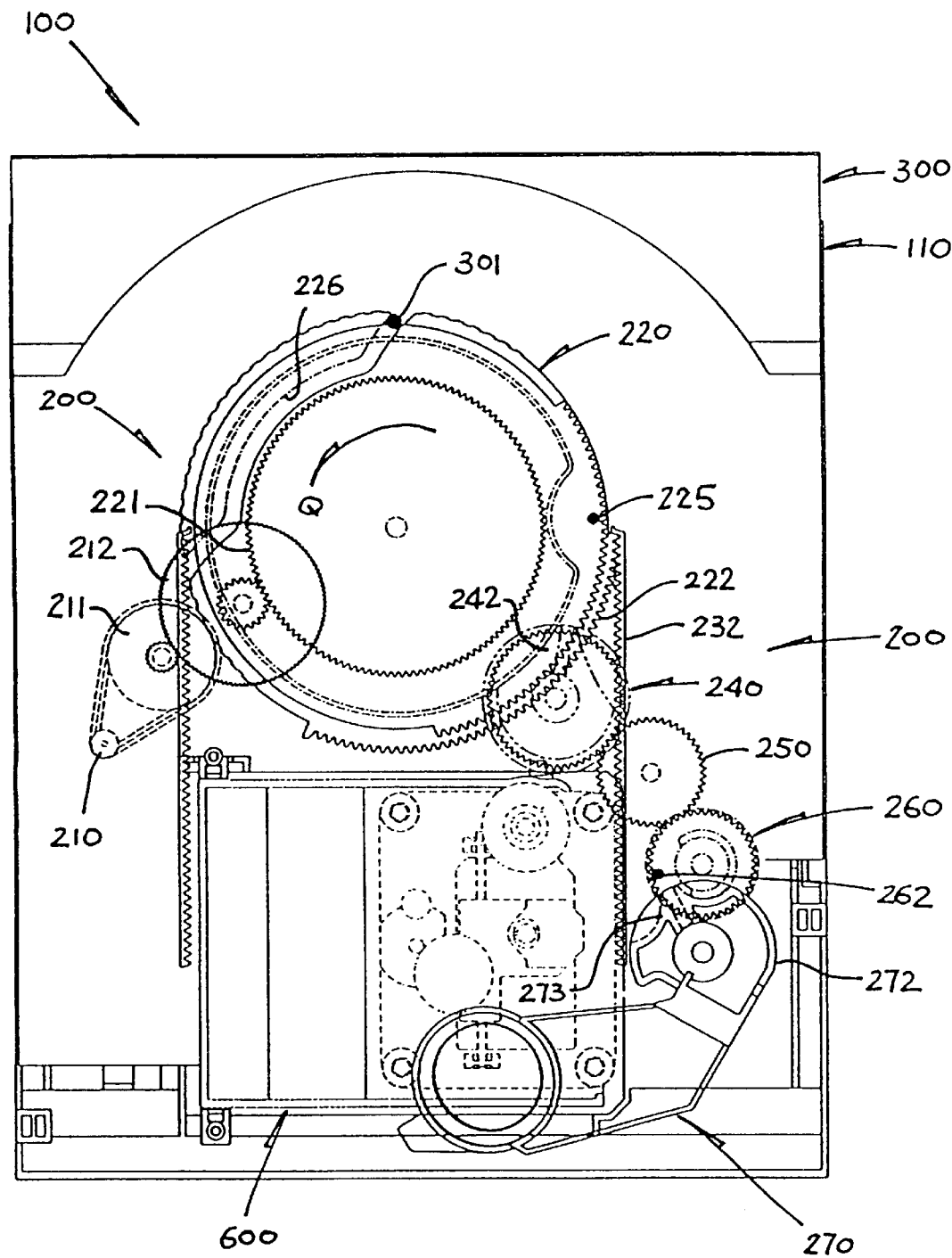
FIG. 4 is a stop plan view corresponding to FIG. 3, showing the tray being slid slightly out by the drive mechanism.

As shown in FIG. 2, the turntable 400 has a fixed central bottom gearwheel 410 and is arranged to be rotated by means of a drive mechanism 310 supported by the tray 300 under the turntable 400 and engaging with the gearwheel 410. The drive mechanism 310 is formed by an electric motor 311, a horizontal shaft 312 driven at its near end by the motor 311 by means of belt/pulleys 313, a worm-gear 314 provided at the far end of the shaft 312, and a double-gearwheel 315 in mesh between the worm-gear 314 and the gearwheel 410 of the turntable 400.

Figure 10:
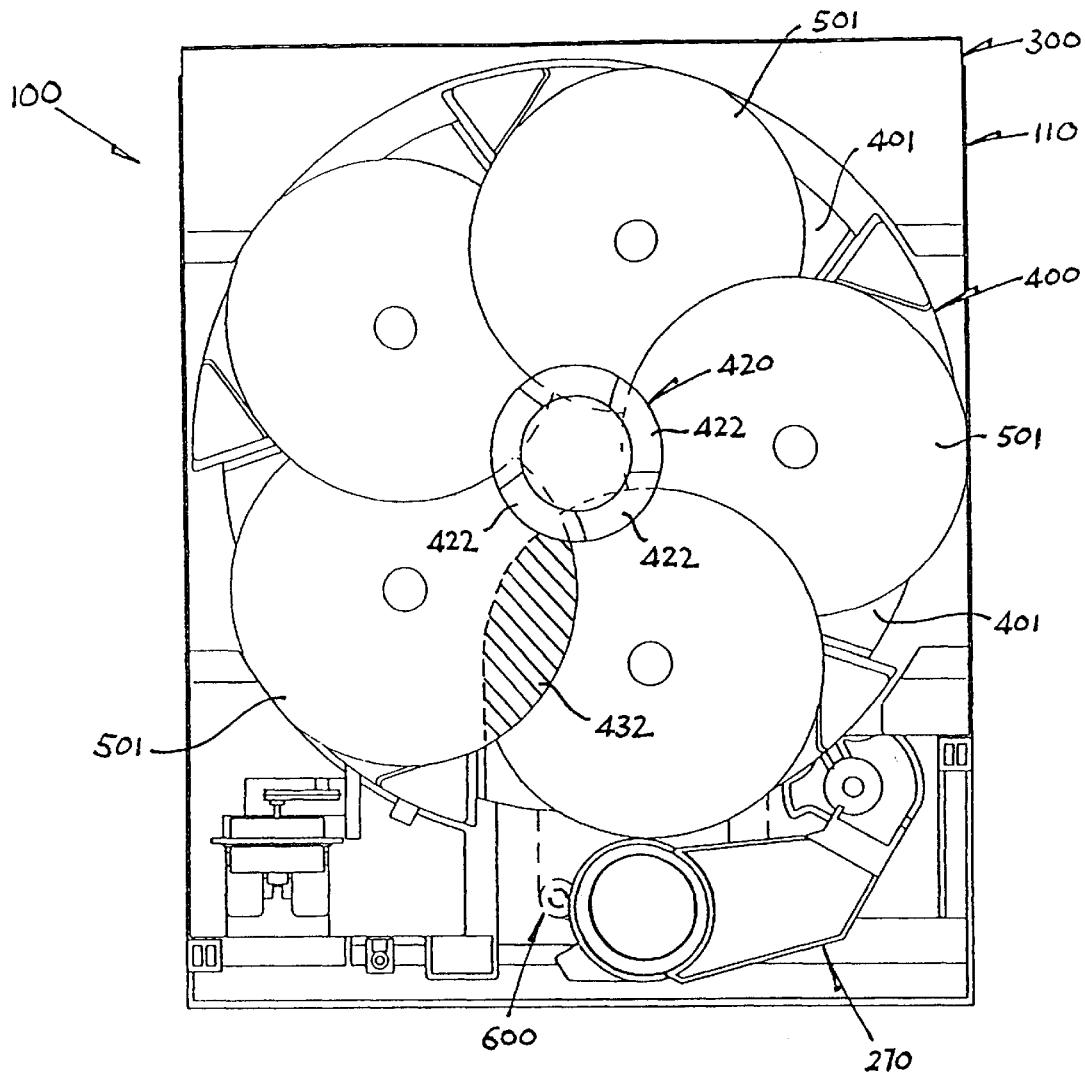
FIG. 10 is a top plan view corresponding to FIG. 1, showing two alternative forms of a disc protector provided on the turntable.
Figure 10A:
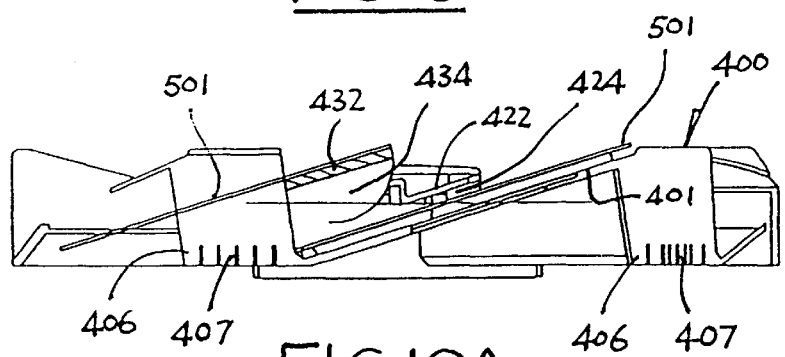
FIG. 10A is an end view of the turntable of FIG. 10.

Referring briefly to FIG. 10A, a bottom wall 406 of the turntable 400 is formed with five sets of encoded slits 407 at predetermined angular positions for detection by means of a light source and a light sensor (not shown) provided on opposite inner and outer sides of the bottom wall 406, whereby the precise angular position of the turntable 400 is detectable and thus controllable by the drive mechanism 310. In particular, the turntable 400 is arranged to have five predetermined angular positions for loading/unloading and playing the respective CDs 501.

The CD changer 100 incorporates a different drive mechanism 200, which is provided at the bottom of the housing 110; for both sliding the tray 300 and operating the playing mechanism 600. As common parts for performing these two functions, the drive mechanism 200 includes, in the order of driving, an electric motor 210, an idle pulley/pinion 211, a double-gearwheel 212 and a horizontal cam/gear disc 220. The cam/gear disc 220 is rotatable about a vertical axis Y by means of a co-axial integral bottom gearwheel 221 in mesh with the double-gearwheel 212. The cam/gear disc 220 includes a pair of lower/outer and upper/inner series of peripheral teeth 222 and 223. Each series 222/223 extends for an angle of about 110° with respect to the axis Y but is shifted from the other series 223/222 for an angle of about 38.2°. The lower side of the cam/gear disc 220 includes a co-axial circular collar 224 having a concave wall portion 224A which extends partially round a depending drive pin 225, at a position immediately behind the tooth series 222/223. An arcuate groove 226 is formed on the upper side of the cam/gear disc 220, which extends for an approximate angle of 110° about the axis Y at a position directly opposite the tooth series 222/223. The tray 300 has a bottom pin 301 for co-operation with the groove 226.

For sliding the tray 300, the drive mechanism 200 includes a pair of opposed lower and upper gear racks 232 and 233 which are fixed on the lower side of the tray 300 on opposite right and left sides of the cam/gear disc 220. The lower rack 232 is arranged to be engaged by the lower tooth series 222 for sliding the tray 300 into or out of the housing 110, upon rotation of the cam/gear disc 220 in direction P or Q, respectively, when the playing mechanism 600 is in a non-playing condition, as illustrated from FIGS. 3 to 5 for the sliding out action or vice versa for the sliding in action. The upper rack 233 is arranged to be engaged by the upper tooth series 223 for sliding the tray 300 into or out of the housing 110, upon rotation of the cam/gear disc 220 in the opposite direction Q or P, respectively, when the playing mechanism 600 is in a playing condition, as illustrated from FIGS. 7 to 9 for the sliding out action or vice versa for the sliding in action.

Figure 6:
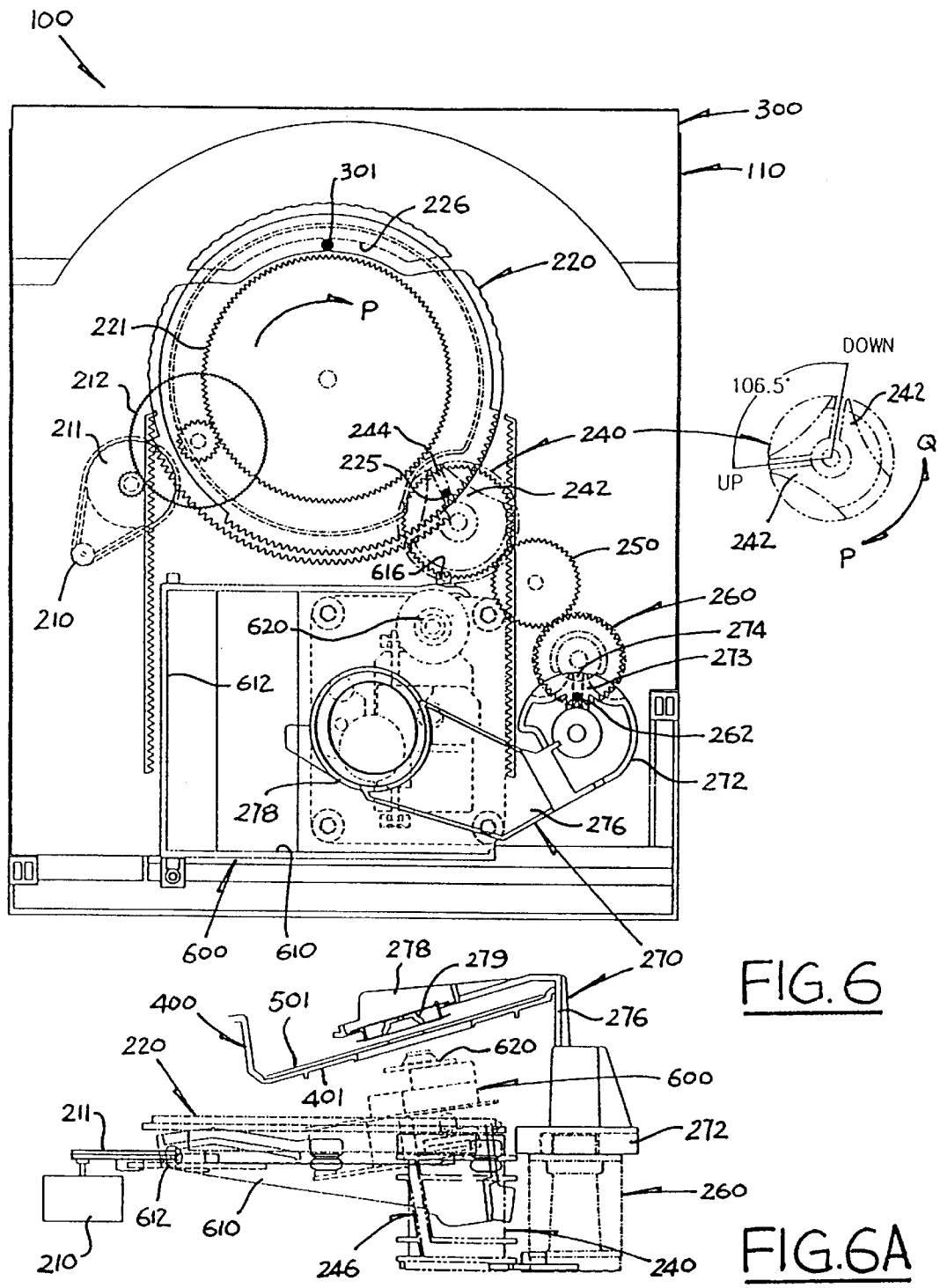
FIG. 6 is a top plan view of the disc changer of FIG. 3, showing the playing mechanism and holder arm being moved by the drive mechanism off the respective inoperative positions.

The tooth series 222/223 rotates to the front side of the cam/gear disc 220 and engages with the corresponding rack 232/233 ahead when the tray 300 is sliding towards or off the outermost position (FIG. 5 or 9), but such engagement will not occur when the tray 300 returns to the innermost position (FIG. 3 or 7), with the tooth series 222/223 rotated back to the rear side of the cam/gear disc 220 and disengaged from the corresponding rack 232/233 behind. The innermost position of the tray 300 is maintained by the groove 226, while rotated to the front side of the cam/gear disc 220, slidably catching the bottom pin 301 of the tray 300. In this condition, as best shown in FIG. 6, the cam/gear disc 220 is permitted to rotate, thereby turning the drive pin 225 across the rear side of the cam/gear disc 220 for operating the playing mechanism 600.

The playing mechanism 600 is provided immediately behind the cam/gear disc 220 and has a generally rectangular body frame 610 extending laterally of the housing 110. The playing mechanism 600 includes a spinning support 620 on the side adjacent the cam/gear disc 220 for supporting and spinning a CD 501 and a central laser head 622 for playing the spinning CD 501. The body frame 610 is hinged, at its rear end 612, to the housing 110 for pivotal movement between a horizontal inoperative position and an operative position inclined at an angle of 17° upwards. Front end portion 614 of the body frame 610 holds the support 620 and head 622 and is provided with a side peg 616 on the side facing the cam/gear disc 220.

For operating the playing mechanism 600, the drive mechanism 200 includes, in the order of driving, a cam/gear cylinder 240, an idle gearwheel 250, a gear cylinder 260 having an axially-extending top drive pin 262, and a CD holder arm 270 having a disc-like rear end 272 pivotable about a vertical axis Z. The top end of the cam/gear cylinder 240 is in the form of a horizontal nib 242 which has a radially-extending central open-ended slot 244. The nib 242 is positioned immediately below and overlapping with the cam/gear disc 220 such that the slot 244 opens directly to the path of the drive pin 225. The nib 242 is arranged to slidably catch, by means of its slot 244, the pin 225 turning close in each opposite direction, upon the cam/gear disc 220 rotating in that direction, and to subsequently release the pin 225 turning away. By reason of the cam action between the slot 244 and the drive pin 225 (FIG. 6), the cam/gear disc 220 turns (for an angle of 35°) the cam/gear cylinder 240 through an angle of 106.5° in the opposite direction.

Around the cylindrical surface, the cam/gear cylinder 240 is formed with a lazy-Z-shaped grooved peripheral cam track 246 which has top and bottom horizontal annular portions 246A and 246C and an inclined intermediate portion 246B extending across the top and bottom portions 246A and 246C. The cam track 246 is arranged to slidably engage with the side peg 616 of the playing mechanism 600 for pivoting, through a cam action, the body frame 610 between the aforesaid inoperative and operative positions. The body frame 610 is pivoted upwards to the operative position (from FIGS. 6 to 7) when the can/gear disc 220 and cylinder 240 turn in directions P and Q respectively. In the respective opposite directions of the cam/gear disc 220 and cylinder 240, the body frame 610 is pivoted downwards to the inoperative position (from FIGS. 7 to 6).

The playing mechanism 600 will not be ready to play CD in the operative position until the holder arm 270 comes into co-operation. The holder arm 270 includes an uppermost disc-like free front end 278 fitted with a freely rotatable circular magnetic holder 279 and a crooked arm portion 276 connecting the front end 278 to the rear end 272. The rear end 272 is in the form of a horizontal nib 273 which has a radially-extending central open-ended slot 274. The nib 273 is positioned immediately above and overlapping with the gear cylinder 260 such that the slot 274 opens directly to the path of the drive pin 262. The nib 273 is arranged to sidably catch, by means of its slot 274, the pin 262 turning close in each opposite direction, upon the gear cylinder 260 turning in that direction, and to subsequently release the pin 262 turning away. By reason of the cam action between the slot 274 and the drive pin 262 (FIG. 6), the gear cylinder 260 turns (for an angle of 109.7°) the rear end 272 and hence the overall arm 270 through an angle of 61.4° in the opposite direction.

In this regard, the holder arm 270 is turntable between an operative position to have its front end 278 positioned directly above the spinning support 620 of the playing mechanism 600 (FIG. 7) and an inoperative position to have its front end 278 moved off to the opposite outer side of the playing mechanism 600 (FIG. 5).

Through the use of the cam/gear cylinder 240 (in common) and the idle gearwheel 250 and gear cylinder 260 (for the holder arm 270 only), the playing mechanism 600 and the holder arm 270 are self-synchronized to be moved between the respective operative and inoperative positions at the same time. The synchronized operative positions define the playing condition of the playing mechanism 600, in which the front end 278 of the holder arm 270 is horizontally pivoted to align flat and close with the spinning support 620 of the playing mechanism 600 pivoted up in order to clamp a CD 501 between them (FIG. 7A) for playing by the laser head 622.

Each seat 401 of the turntable 400 is formed with a cutout 402, through which the spinning support 620 of the playing mechanism 600 is pivoted up to reach the front end 278 of holder arm 270. In order to reach this playing position, the CD 501 is lifted by the spinning support 620 in a manner parallel to and for a small distance of preferably 4.3 mm (in the range of 2 mm to 6 mm) off the turntable seat 401. The CD clamping action is self-tightened by means of the magnetic holder 279 attracting the spinning support 620 close. The aforesaid synchronized inoperative positions define the non-playing condition of the playing mechanism 600, in which the CD 501 is released to rest back on the respective seat 401 of the turntable 400.

Figure 1B:
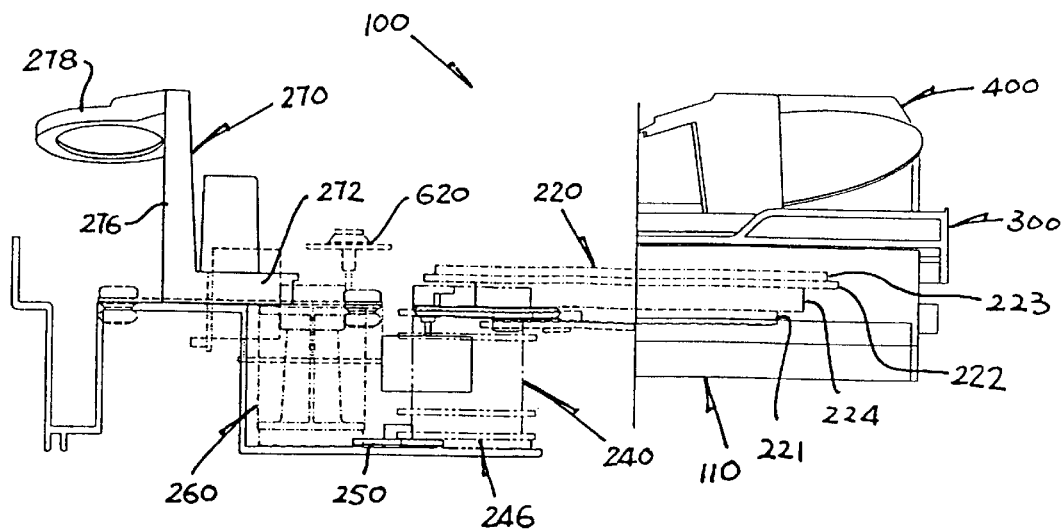
FIG. 1B is a right side view of the disc changer of FIG. 1 in the same condition.
Figure 8:
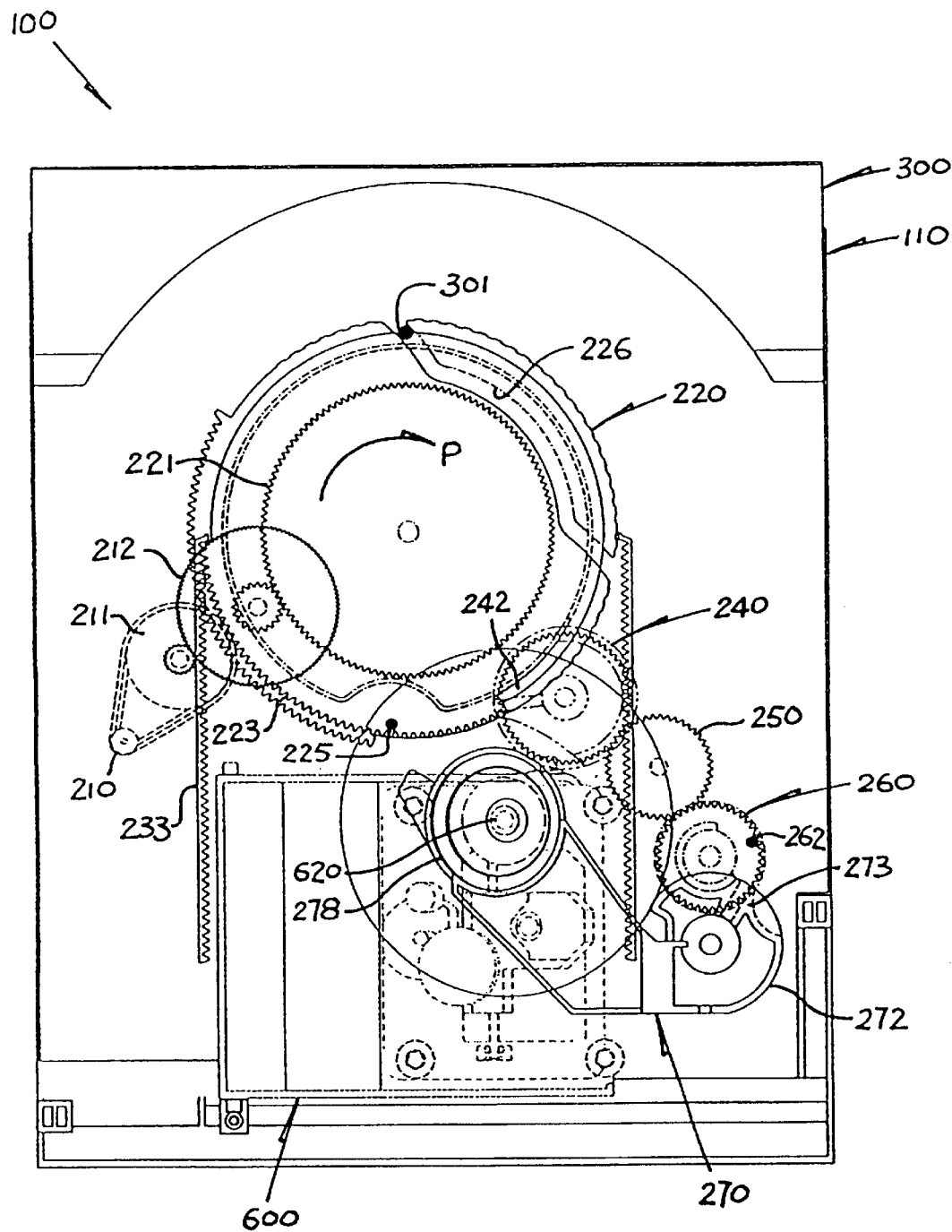
FIG. 8 is a top plan view corresponding to FIG. 7, showing the tray being slid slightly out by the drive mechanism.
Figure 9:
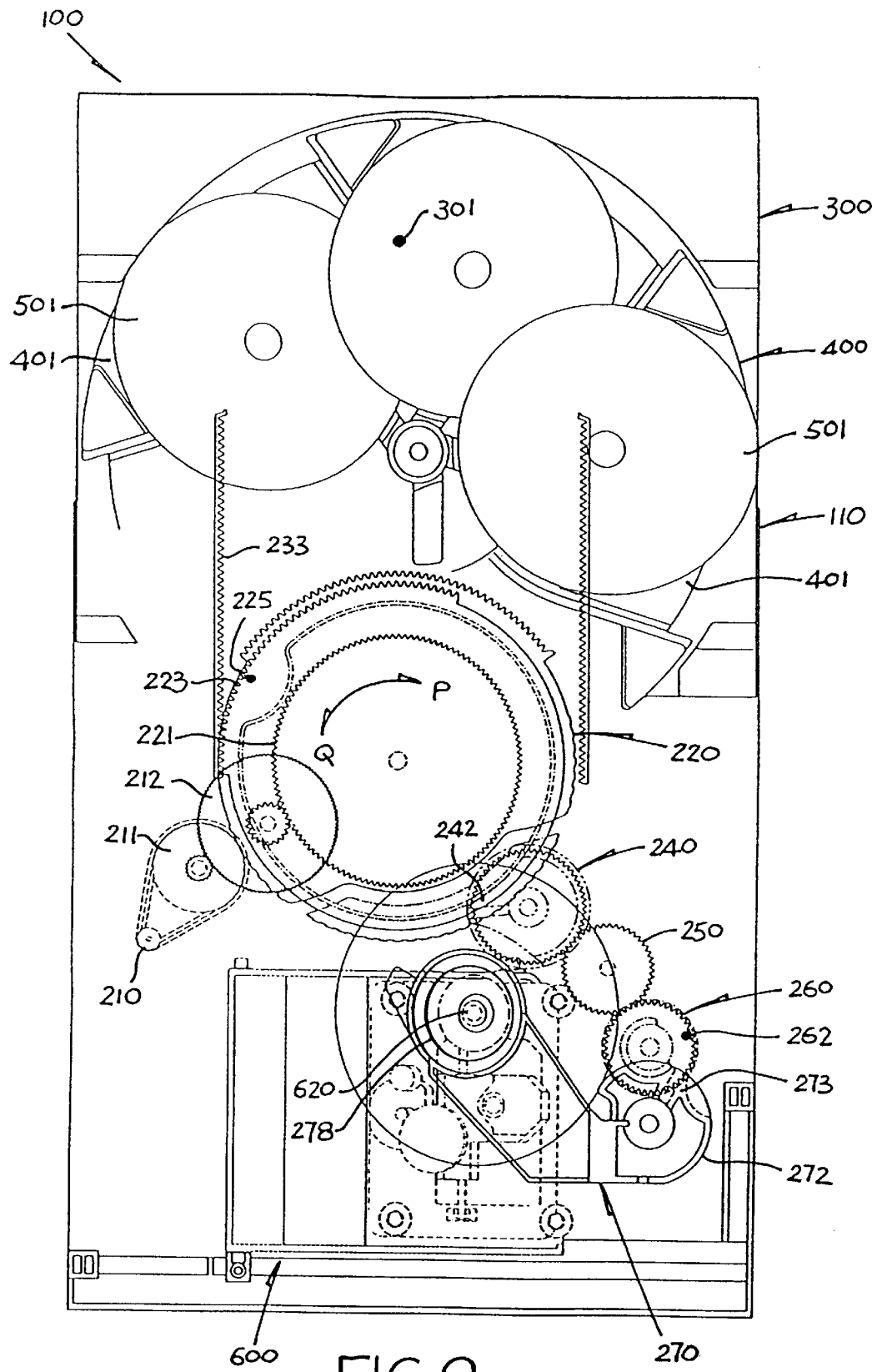
FIG. 9 is a top plan view corresponding to FIG. 8, showing the tray being slid fully out by the drive mechanism.

In the playing condition of the playing mechanism 600, while a CD 501 is being lifted off the turntable 400, the tray 300 and turntable 400 may be slid out (and then back in) by means of the upper tooth series 223 acting on the tray upper rack 233, upon rotation of the cam/gear disc 220 in direction P (and then in opposite direction Q), as shown from FIGS. 7 to 9 (or vice versa for the sliding back in action). To permit such sliding movement of the tray 300 and turntable 400, the cutout 402 of the respective seat 401, from which the CD 501 is lifted up, is formed to open rearwards or face the spinning support 620 of the playing mechanism 600 as best shown in FIG. 1. In the outermost position, the turntable 400 may be unloaded and/or loaded with a new CD, when turned by the drive mechanism 310 to expose the desired seat 401 frontmost.

While the cam/disc 220 is rotating firstly in direction P and then in opposite direction Q to slide the tray 300 and turntable 400 out and then back in respectively, because of the condition that the driving pin 225 has already turned in direction P past the nib 242, the cam/gear cylinder 240 and in turn both the playing mechanism 600 and the holder arm 270 will remain in the respective operative positions, without disturbing the playing condition of the playing mechanism 600.

In the non-playing condition of the playing mechanism 600, the tray 300 and turntable 400 are of course free to be slid out (and then back in) by means of the lower tooth series 222 acting on the tray lower rack 232, upon rotation of the cam/gear disc 220 in direction Q (and then in opposite direction P). In the outermost position, the turntable 400 may likewise be unloaded and/or loaded with a new CD, when turned by the drive mechanism 310 to expose the desired seat 401 frontmost. While the cam/disc 220 is rotating firstly in direction Q and then in opposite direction P to slide the tray 300 and turntable 400 out and then back in respectively, because of the condition that the driving pin 225 has already turned in direction Q past the nib 242, the cam/gear cylinder 240 and in turn both the playing mechanism body frame 610 and the holder arm 270 will remain in the respective inoperative positions, without disturbing the non-playing condition of the playing mechanism 600.

The opposite sides of the nib 242 of the cam/gear cylinder 240 are symmetrically curved inwards at the same curvature as the outer side of the collar 224 such that either nib side is engageable close against the adjacent collar outer side to lock the cam/gear cylinder 240 in the respective extreme angular position, thereby locking the corresponding positions of the playing mechanism 600 and holder arm 270. The same construction and arrangement apply to the nib 273 of the rear end 272 of the holder arm 270 in co-operation with a top co-axial collar 264 of the gear cylinder 260, for locking the holder arm 270 in respective extreme angular positions.

As the CDs 501 are placed closely together on the turntable 400 in a tilted and overlapping arrangement, the removal of any one CD 501 may accidentally hit/displace the adjacent CD 501 which overlaps with it from above. Two alternative forms of disc protectors may be provided on the turntable 400 to avoid such disc displacement, as shown in FIGS. 10 and 10A. In the first preferred form, the protectors are provided by a small co-axial disc 420 provided atop the turntable 400 to form five sectors 422 overlying the innermost parts of the respective seats 401. Each sector 422 extends parallel to and forms a thin gap 424 with the respective seat 401 for restricting the movement of the innermost part of the respective CD 501 upon removal. In the second preferred form, each protector is provided by a respective part-circular flange 432 which extends out in the same plane from the tilted-up side of a respective seat 401 to overlie the next seat 401 below. The flange 432 has a free edge matching with the respective edge portion of the CD 501 in the original seat 401 and forms a gap 434 with the next seat 401 for restricting the movement of the lowermost part of the CD 501 upon removal from the next seat 401 to avoid hitting the CD 501 in the original seat 401.

Figure 11A:
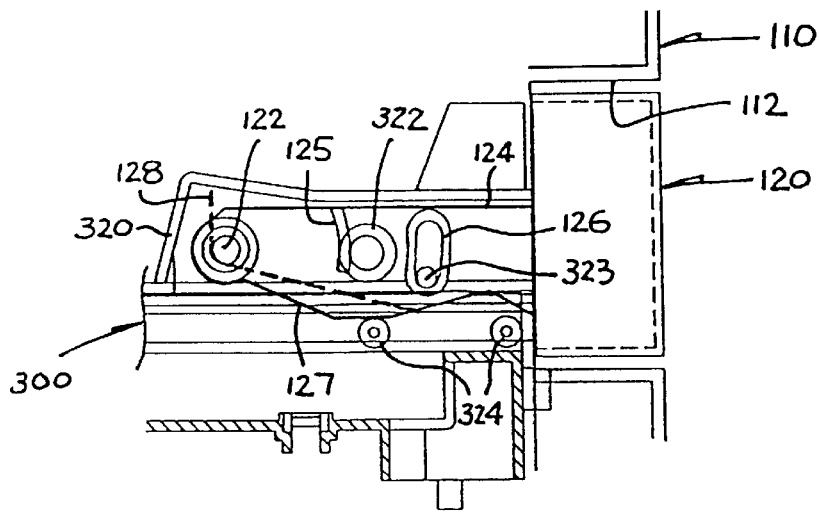
FIGS. 11A to 11C are right side views of a front part of the disc changer of FIG. 1, showing sequentially how a door for the tray is opened.
Figure 11B:
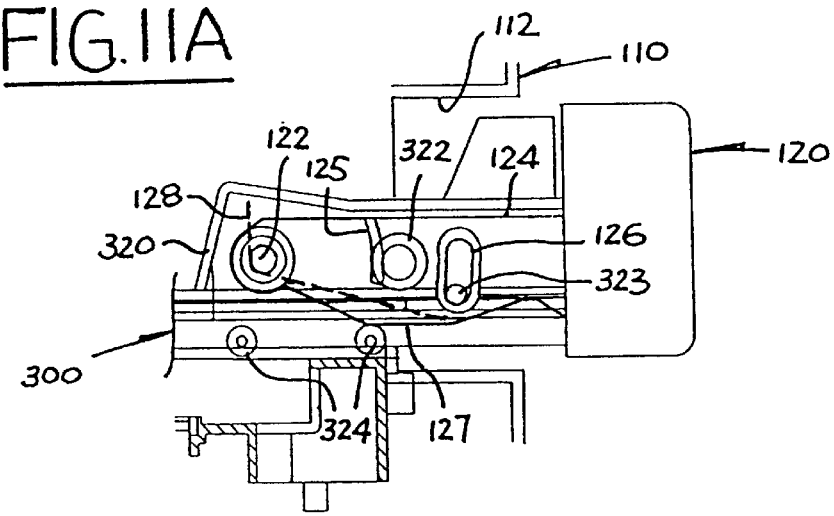
Figure 11C:
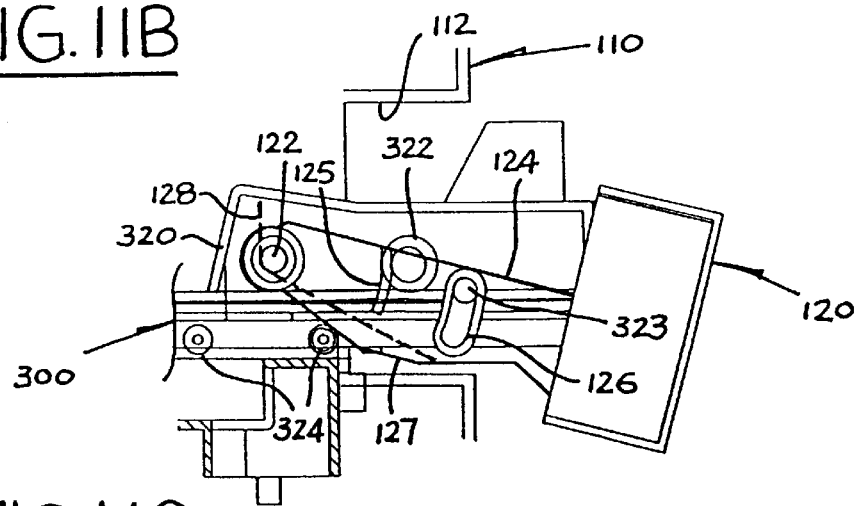

Reference is finally made to FIGS. 11A to 11C of the drawings. The housing 110 has a front slot opening 112 through which the tray 300 and turntable 400 are slidable out and in. The opening 112 is normally closed by a door 120 which is operable automatically at suitable times when the tray 300 slides. In a preferred construction, the door 120 is hinged at 122 by means of a pair of links 124 to respective formations 320 provided on opposite sides of the front end of the tray 300. Each formation 320 has a gear 322 in engagement with an arcuate gear rack 125 of the respective link 124 for damping the hinged movement of the door 120, and includes a pin 323 engaging within a slot 126 of the link 124 for limiting the movement of the door 120. Each link 124 has a profiled bottom side 127 for sliding on a pair of rollers 324 provided on the tray 300. The two links 124, and hence the door 120, are resiliently biased downwards (or upwards if the door 120 is heavy) by respective elbow springs 128.

In operation, when the tray 300 slides initially out of the housing opening 112, the door 120 is moved to slide out simultaneously without hinging downwards, with each link 124 being supported by the respective rollers 324 (FIG. 11B). When the door 120 slides sufficiently outwards, the links 124 start to hinge down about the respective outer rollers 324, primarily under the action of the springs 128 (or the weight of the door 120 if heavy), thereby bringing the door 120 down until becoming clear of the opening 112 (FIG. 11C). The door 120 will remain opened until the tray 300 later slides back almost completely into the housing 110, whereupon the door 120 closes automatically behind through the reverse operation.

The invention has been given by way of example only, and various other modifications of and/or alterations to the described embodiment may be made by persons skilled in the art without departing from the scope of the invention as specified in the appended claims.

What is claimed is:

1. A multiple medium-storage disc changer comprising:
   a housing;
   a turntable slidable out of and into the housing and providing a circular series of seats for holding respective medium-storage discs;
   a movable playing mechanism provided under the turntable and comprising a spinning support for lifting and supporting a disc off the respective seat of the turntable and a laser head for playing the supported disc;
   and a separate holder movable to-hold, from above, the disc against the spinning support for playing by the laser head, wherein the seats provided by the turntable are inclined for holding respective discs in a tilted and overlapping arrangement.

2. A multiple medium-storage disc changer as claimed in claim 1, wherein each seat of the turntable is arranged to hold a respective disc at an angle substantially in the range of 15° to 20° to horizontal.

3. A multiple medium-storage disc changer as claimed in claim 2, wherein each seat of the turntable is arranged to hold a respective disc at an angle substantially of 17° to horizontal.

4. A multiple medium-storage disc changer as claimed in claim 1, wherein the spinning support is arranged to lift said disc from the respective seat in a manner substantially parallel to and for a distance substantially in the range of 2 mm to 6 mm off the seat.

5. A multiple medium-storage disc changer as claimed in claim 4, wherein the spinning support is arranged to lift said disc from the respective seat in a manner substantially parallel to and for a distance substantially of 4.3 mm off the seat.

6. A multiple medium-storage disc changer as claimed in claim 1, wherein the holder is pivotable about a substantially vertical axis between an operative position and an inoperative position.

7. A multiple medium-storage disc changer as claimed in claim 1, wherein the spinning support and laser head of the playing mechanism are pivotable about a substantially horizontal axis between an upper operative position and a lower inoperative position.

8. A multiple medium-storage disc changer as claimed in claim 1, wherein the movements of the holder and the playing mechanism are synchronized.

9. A multiple medium-storage disc changer as claimed in claim 8, wherein the movements of the holder and the playing mechanism are effected by means of a drive mechanism incorporating a common cam member.

10. A multiple medium-storage disc changer as claimed in claim 9, wherein the drive mechanism includes a motor-driven drive member for driving the cam member.

11. A multiple medium-storage disc changer as claimed in claim 10, wherein the drive member is arranged to also slide the turntable out of and into the housing.

12. A multiple medium-storage disc changer as claimed in claim 11, wherein the turntable is rotatably supported on a tray for being slid out of and into the housing, said tray comprising a gear rack for driving engagement with the drive member to cause the sliding of the tray.

13. A multiple medium-storage disc changer as claimed in claim 12, wherein the tray is provided with two opposed said gear racks for driving engagement, at different times, with the drive member to cause the sliding of the tray while the playing mechanism and holder are in operative and inoperative positions, respectively.

14. A multiple medium-storage disc changer as claimed in claim 1, wherein the holder has a pivoted lower end, a free upper end for holding said disc against the spinning support, and a crooked arm connecting the upper end to the lower end.

15. A multiple medium-storage disc changer as claimed in claim 1, wherein the turntable is provided with parts which form gaps with the respective seats for restricting the movement of said discs upon removal.

16. A multiple medium-storage disc changer as claimed in claim 1, wherein the turntable is rotatably supported on a tray for being slid out and in through an opening of the housing, and the tray supports at its front end a door for closing the opening, which door is movable downwards to reveal the opening when the tray slides initially out and subsequently upwards to close the opening when the tray slides almost completely in.

17. A multiple medium-storage disc changer as claimed in claim 16, wherein the door is hinged to opposite sides of the front end of the tray by means of two links.

18. A compact disc player incorporating a multiple medium-storage disc changer as claimed in claim 1.

* * * * *